United States Patent [19]

Teinert

[11] Patent Number: 5,028,324

[45] Date of Patent: Jul. 2, 1991

[54] STRETCHING MECHANISM FOR A SCREEN

[75] Inventor: Victor E. Teinert, Friendswood, Tex.

[73] Assignee: Harrisburg, Inc., Houston, Tex.

[21] Appl. No.: 433,860

[22] Filed: Nov. 9, 1989

[51] Int. Cl.⁵ .......................................... B01D 33/056
[52] U.S. Cl. .................................... 210/232; 209/402; 209/403; 210/400; 210/499
[58] Field of Search ................................. 209/402–405; 210/232, 238, 388, 389, 400, 499

[56] References Cited

U.S. PATENT DOCUMENTS

| | | | |
|---|---|---|---|
| 1,919,485 | 7/1933 | Soldan | 209/403 |
| 2,190,993 | 2/1940 | Muir | 209/403 X |
| 2,609,930 | 9/1952 | Soldan | 209/403 X |
| 2,825,461 | 3/1958 | Hannon | 209/402 X |
| 2,899,059 | 8/1959 | Schroth | 209/403 |
| 2,899,060 | 8/1959 | Schroth | 209/403 |
| 3,077,990 | 2/1963 | Peterson | 210/402 X |
| 3,101,314 | 8/1963 | Johnson | 209/403 X |
| 3,219,065 | 11/1965 | Moeller | 209/403 X |
| 3,307,704 | 3/1967 | Pashaian et al. | 210/400 |
| 3,346,114 | 10/1967 | Hoyt | 209/403 |
| 3,469,695 | 9/1969 | Greeninger | 209/403 |
| 3,718,963 | 3/1973 | Hawkins et al. | 209/403 X |
| 3,797,659 | 3/1974 | Kauffman | 209/402 X |
| 4,137,157 | 1/1979 | Deister et al. | 209/403 |
| 4,146,483 | 3/1979 | Lee | 210/400 X |
| 4,303,509 | 12/1981 | Lilie | 209/403 |
| 4,732,670 | 3/1988 | Nelson | 209/403 X |
| 4,906,352 | 3/1990 | Nelson | 209/403 |

FOREIGN PATENT DOCUMENTS

| | | | |
|---|---|---|---|
| 1077662 | 3/1984 | U.S.S.R. | 209/403 |
| 1319926 | 6/1987 | U.S.S.R. | 209/403 |
| 509591 | 7/1939 | United Kingdom | 209/403 |

Primary Examiner—Robert Spitzer
Attorney, Agent, or Firm—Marshall, O'Toole, Gerstein, Murray & Bicknell

[57] ABSTRACT

A lock mechanism for use with a screen having a generally square or rectangular configuration and elongated hooks or flanges along two opposed side edges thereof, and rails which extend along and engage the hooks. The lock mechanism comprises at least one arm and a crank. The arm has an outer end coupled to a rail and an inner end pivotably connected to the crank. The crank is rotatable about an axis and it is pivotably connected to the arm on an axis which is spaced from the axis of rotation. Rotation of the crank in one direction causes the arm to be extended outwardly and stretch the screen; rotation of the crank in the other direction retracts the arm and relaxes the screen. A lock is provided between the arm and the crank to hold the arm extended, and a spring is preferably provided between the arm and the associated rail. Preferably a second arm, connected similarly to the first mentioned arm, connects the crank with the other rail.

5 Claims, 2 Drawing Sheets

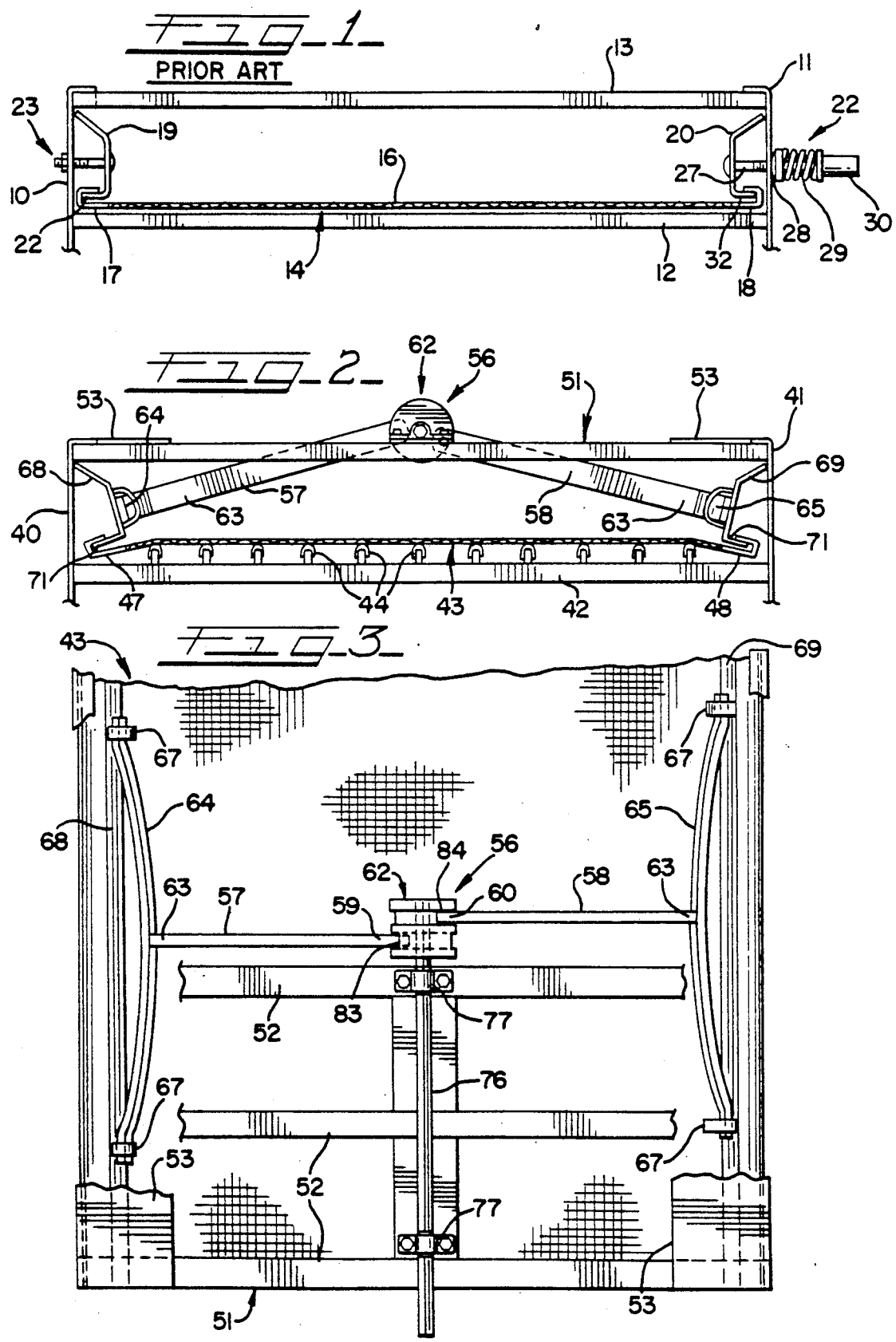

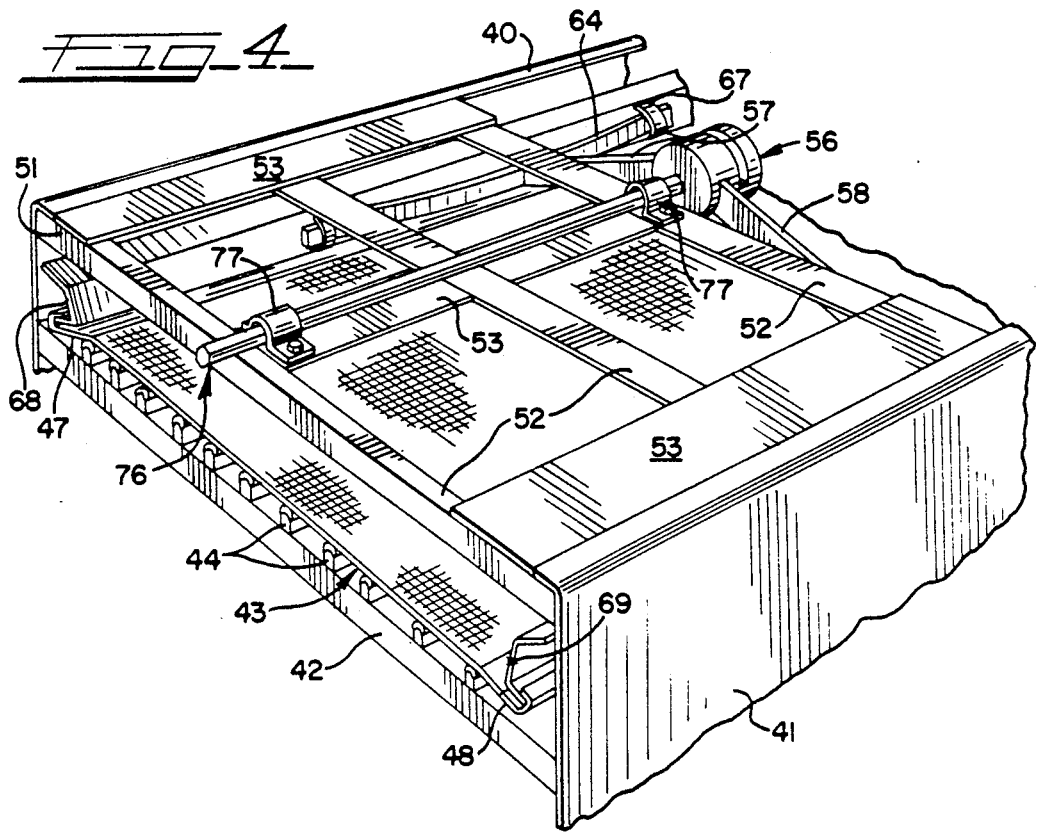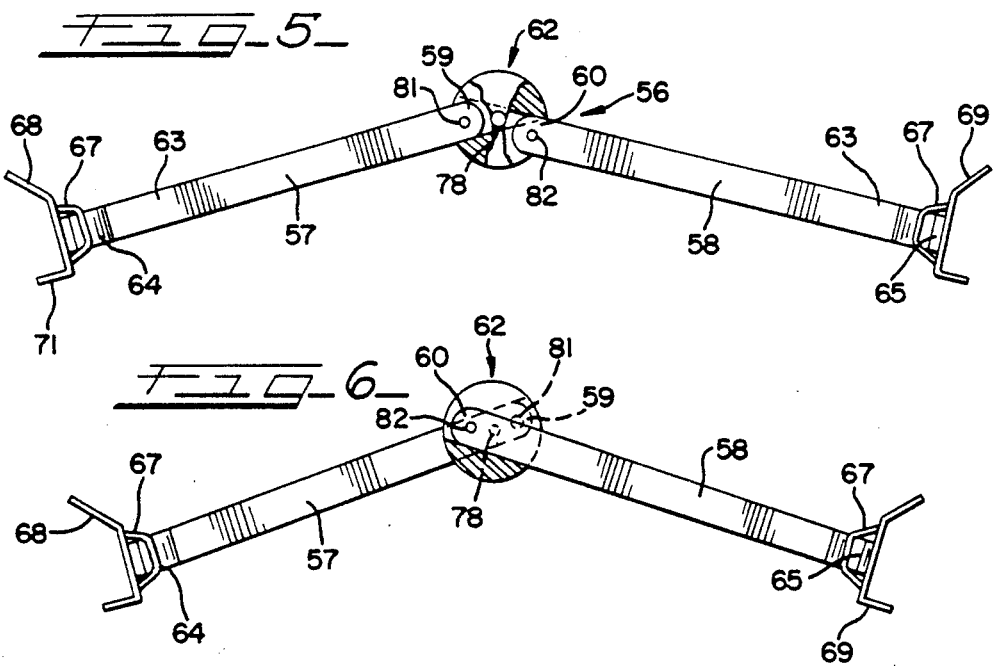

STRETCHING MECHANISM FOR A SCREEN

FIELD AND BACKGROUND OF THE INVENTION

This invention relates to shakers or separators for removing shale from drilling mud and for cleaning the mud; more particularly it relates to a mechanism for supporting and tensioning a screen of such a machine.

When drilling a well such as an oil or gas well, drilling mud is circulated through the hole, and the mud carries solids, such as pieces of shale, out of the hole. It is necessary to remove the solids from the mud before using it again, and a machine known as a shale shaker is provided for this purpose. A shaker includes one or more metal wire screens, and the mud is flowed through a screen in order to strain out the solids. The screen is normally vibrated or shaken in order to speed the flow of mud through it.

Each screen of a shaker is secured in a metal frame and is stretched tightly in the frame. In the prior art arrangement shown in FIG. 1 and described more fully hereinafter, a series of locks are provided along one side edge of the screen. The locks connect with and pull on one side edge in order to tension or stretch the screen.

While the prior art lock operates satisfactorily, it has a number of disadvantages. A number of locks are provided and they are independently operated, which requires either a number of men or an excessive amount of time to operate the locks in order to remove a screen and replace it. Since the locks are independently operated, they may not tension the screen uniformly along its length. Further, the locks are mounted along one side of the machine at a location which is rather difficult to service.

It is a general object of this invention to provide an improved tensioning and lock mechanism for a screen, which avoids the foregoing disadvantages.

SUMMARY OF THE INVENTION

A lock mechanism in accordance with this invention is for use with a screen having a generally square or rectangular configuration and elongated hooks or flanges along two opposed side edges thereof, and rails which extend along and engage the hooks.

The lock mechanism comprises at least one arm and a crank. The arm has an outer end coupled to a rail and an inner end pivotably connected to the crank. The crank is rotatable about an axis and it is pivotably connected to the arm on an axis which is spaced from the axis of rotation. Rotation of the crank in one direction causes the arm to be extended outwardly and stretch the screen; rotation of the crank in the other direction retracts the arm and relaxes the screen. A lock is provided between the arm and the crank to hold the arm extended, and a spring is preferably provided between the arm and the associated rail. Preferably a second arm, connected similarly to the first mentioned arm, connects the crank with the other rail.

BRIEF DESCRIPTION OF THE DRAWINGS

The foregoing other objects and advantages of the present invention will be better understood from the following detailed description taken in conjunction with the accompanying figures of the drawings, wherein:

FIG. 1 shows a prior art apparatus;

FIG. 2 shows apparatus including a screen tensioning and lock mechanism in accordance with the present invention;

FIG. 3 is a plan view of the apparatus shown in FIG. 2;

FIG. 4 is a perspective view of the apparatus;

FIG. 5 is a view of a portion of the apparatus; and

FIG. 6 is a view similar to FIG. 5 but showing different positions of the parts.

DETAILED DESCRIPTION OF THE DRAWINGS

FIG. 1 shows a prior art shale shaker machine including two side frame plates 10 and 11 and braces 12 and 13 which hold the side plates 10 and 11 in spaced relation. Stretched between the two side plates 10 and 11 is a conventional screen 14 which includes a generally square or rectangular wire mesh screen 16 and hooks 17 and 18 along the two side edges. The screen 14 is stretched between the two side plates 10 and 11 by a fixed rail 19 and a movable rail 20, the rails extending along the length of the hooks 17 and 18. With regard first to the fixed rail 19, it has an outwardly extending flange 22 along its lower edge which interconnects with the hook 17 at the adjacent side of the screen 14. The rail 19 is secured to the plate 10 by a nut and bolt assembly 23 which securely fastens the rail 19 to the side plate 10. The movable rail 20 is adjustably mounted on the side plate 11 by a plurality of tension-bolt assemblies 26, only one assembly being shown in FIG. 1. The assembly 26 includes an elongated carriage bolt 27 which extends through holes formed in the plate 11 and the rail 20. On the outside of the plate 11, a washer 28, a compression spring 29 and a tension nut 30 are mounted on the bolt 27. The lower edge of the movable rail 20 also includes a flange 32 which interconnects with the hook 18 on the adjacent side of the screen 14. It will be apparent from FIG. 1 that when the nuts 30 of the assemblies 22 are tightened, the lower end including the flange 32 of the rail 20 will be pulled toward the right, thereby stretching the screen 14 between the two rails 19 and 20. To remove and replace a screen 14, the nuts 30 of all of the tension-bolt assemblies 26 must be loosened in order to release the tension on the screen, and then the screen may be removed by sliding the hooks 17 and 18 along the two rails in order to disengage the hooks from the two flanges 22 and 32. As previously described, the foregoing described arrangement shown in FIG. 1 has a number of disadvantages which are obviated by a mechanism in accordance with the present invention.

The machine shown in FIGS. 2, 3 and 4 also includes a pair of side plates 40 and 41 similar to the plates 10 and 11 shown in FIG. 1. A lower cross brace 42 connects the two plates 40 and 41 below a conventionally constructed screen 43. A series of rubber cushions 44 are mounted on the upper side of the cross brace 42 and engage the underside of the center wire mesh area 46 of the screen in order to support the wire mesh. At the two side edges of the wire mesh are secured two hooks 47 and 48 as previously described.

Above the screen 43 and adjacent the upper ends of the two side plates 40 and 41 is mounted a frame 51 formed by a plurality of laterally extending braces 52 and, adjacent the center and each of the side plates 10 and 11, plates 53. The frame 51 is secured as by welding to the side plates 10 and 11, and the frame 51 supports a screen-tensioning mechanism constructed in accordance with the present invention, the mechanism being indicated generally by the reference numeral 56.

The mechanism 56 comprises a pair of laterally extending arms 57 and 58, the arms 57 and 58 having inward ends 59 and 60 which are pivotally connected to a rotatable cam or crank 62. At their outer ends 63, the two arms 57 and 58 are secured as by welding to elongated leaf springs 64 and 65, the arms being secured to the center portions of the two leaf springs and the springs bowing outwardly as best illustrated in FIG. 3. At the outer ends of the two springs 64 and 65, loops 67 connect the springs 64 and 65 with two rails 68 and 69. The two rails 68 and 69 are similar to the rails 19 and 20 of the prior art machine shown in FIG. 1. Each rail includes an outwardly extending flange 71 which extends along the lower edge of each rail, and the flanges 71 interconnect with the hooks 47 and 48 at the side edges of the screen 43.

The crank 62 is rotatably mounted on the machine by an operating rod 76, the rod 76 in turn being mounted by bearings 77 on the frame 51, as best shown in FIGS. 3 and 4. Thus, the cam 62 is rotatable on the axis (indicated by the numeral 78) of the rod 76 and the cam 62. Displaced from the axis 78 and on opposite sides of the axis (see FIGS. 5 and 6) are two pins 81 and 82 which respectively pivotally connect the ends 59 and 60 of the arms to the crank 62. The crank 62 is rotatable between the positions shown in FIG. 5 wherein the arms 57 and 58 are in their extended positions, and the positions shown in FIG. 6 wherein the arms 57 and 58 are in their retracted positions. When in the extended positions, the pins 81 and 82 are located close to a line drawn between the axis 78 and the outer ends of the two arms. In other words, the pin 82, for example, is between the axis 78 and the spring 65 and the longitudinal centerline of the arm 58 is nearly in line with the axis 78. On the other hand, when the arms are in the retracted positions, the pins 81 and 82 are displaced on the opposite sides of the axis 78, with the result that the inner ends 59 and 60 of the arms are pulled toward the center of the machine and on the opposite sides of the axis 78 of the crank 62. The crank 62 is rotated about 190° (in the present specific example) when going from one position to the other, and in both positions the pins 81 and 82 are moved over center to locked positions.

The crank 62 is a generally cylindrical member and has two slots 83 and 84 (see FIG. 3) formed in it, the ends 59 and 60 extending into the two slots. When the crank 62 is rotated clockwise as seen in FIGS. 5 and 6 to move the arms 57 and 58 to the extended positions, the pins 81 and 82 move slightly past the center position where the arms are aligned with the axis 78; the pins move over center slightly as shown in FIG. 5, and the ends 59 and 60 have edges which engage the bottom surfaces 85 of the two slots. The bottom surfaces 85 thus form stops which prevent further rotation of the crank 62 in the clockwise position. When the two arms 57 and 58 are extended, the two leaf springs 64 and 65 are flattened somewhat and exert pressure toward the two side plates 40 and 41 of the machine, thereby tending to move the hooks 47 and 48 outwardly and stretch the screen tightly. The thrust forces of the two springs 64 and 65 also tend to move the inner ends 59 and 60 of the arms inwardly, but the over-center positions of the pins 81 and 82 and the abutments between the ends and the bottoms of the two grooves prevent further movement.

To move the arms to the retracted positions shown in FIG. 6 and thereby release the tension on the screen 43, the operating rod 76 is manually turned in the counterclockwise direction as seen in FIGS. 5 and 6. The pins 81 and 82 first move through the center positions and then the pins (and, of course, the inner ends of the arms) swing away from the associated sides of the machine and thereby reduce the pressure on the two leaf springs 64 and 65. The operating rod 76 is turned over center, past the positions where the center lines of the arms 57 and 58 are aligned with the axis 78 and the pins 81 and 82, to the locked positions where the edges of the arms again engage the bottoms 85 of the grooves 83 and 84. The rails are thus held open, and when the pressure has been released on the springs 64 and 65, the screen 43 may be removed by sliding the two hooks 47 and 48 lengthwise toward the left end of the machine as seen in FIG. 4. A new screen may, of course, be installed by the reverse procedure.

It will be apparent from the foregoing that an advantageous and novel mechanism has been provided. The mechanism is easily operated by turning a single rod from one end of the machine. The rod 76 is easily accessible and easily turned by one person, and turning of the crank 62 through a short angle is all that is needed to move the arms between the extended and retracted positions. The leaf springs apply force on the opposite ends of the two rails 68 and 69 and they apply uniform tension along both sides of the screen.

While a specific example is shown wherein a movable arm is coupled to each side of the screen, an alternative arrangement may include means to hold one edge of a screen stationary and have a crank and a movable arm coupled to move the other edge of the screen.

What is claimed is:

1. Apparatus for use in a machine including a screen having a center wire mesh area and elongated hooks extending along two opposite side edges of said center wire mesh area, and two rails which extend along and interconnect with said hooks; the apparatus comprising stationary support means extending underneath and supporting said center wire mesh area, two arms and a crank, each arm having an inner end connected to said crank and an outer end, a spring coupling said outer end of each of said arms with one of said rails, means for rotatably mounting said crank on said machine, said crank being rotatable on an axis and said inner ends being connected to said crank at pivot points which are offset from said axis, whereby said arms are shifted laterally outwardly toward said rails upon rotation of said crank and thereby move said springs outwardly and said springs press said rails and said hooks outwardly and stretch said center wire mesh area across said stationary support means.

2. Apparatus as set forth in claim 1, wherein each of said springs comprises a leaf spring.

3. Apparatus as set forth in claim 1, wherein said crank includes stop surface means for engaging said outer ends of said arms when said arms are extended.

4. Apparatus for stretching a screen, the screen including a center wire mesh area and hooks formed along two opposite sides of said mesh area, said apparatus comprising stationary support means extending underneath said center wire mesh area, an arm, a spring coupling said arm to one of said hooks, a crank coupled to the other of said hooks, said crank being rotatable on an axis, pivot means pivotably connecting said arm to said crank, said pivot means being offset from said axis, whereby rotation of said crank causes said pivot means to swing about said axis and shift said arm laterally outwardly and press said spring against said one hook and move said hook outwardly and stretch said center wire mesh area across said stationary support means.

5. Apparatus as set forth in claim 4, and further including a second arm connected to said crank, a second spring connected between said second arm and the other of said hooks, and second pivot means pivotably connecting said second arm to said crank, said second pivot means being offset from said axis and said first mentioned pivot means.

* * * * *